(12) United States Patent
Thielke et al.

(10) Patent No.: US 6,324,564 B1
(45) Date of Patent: Nov. 27, 2001

(54) OPTIMIZED WIRELESS COMMUNICATION SYSTEM

(75) Inventors: Wesley R. Thielke, Somerville; Boris Fridman; Vladimir A. Shimarov, both of Princeton, all of NJ (US)

(73) Assignee: Nettech Systems, Inc., Princeton, NJ (US)

(*) Notice: Subject to any disclaimer, the term of this patent is extended or adjusted under 35 U.S.C. 154(b) by 0 days.

(21) Appl. No.: 09/249,571

(22) Filed: Feb. 12, 1999

Related U.S. Application Data

(60) Provisional application No. 60/087,723, filed on Jun. 2, 1998.

(51) Int. Cl.[7] .................................................. G06F 13/00
(52) U.S. Cl. ......................... 709/202; 709/230; 709/203
(58) Field of Search ................................. 709/202, 230, 709/203

(56) References Cited

U.S. PATENT DOCUMENTS

| | | |
|---|---|---|
| 5,327,486 | 7/1994 | Wolff et al. .................... 379/93.23 |
| 5,673,322 | 9/1997 | Pepe et al. ............................ 705/52 |
| 5,742,668 | 4/1998 | Pepe et al. ........................... 455/415 |
| 5,742,905 | 4/1998 | Pepe et al. ........................... 455/461 |
| 5,948,066 | * 9/1999 | Whalen et al. ...................... 709/229 |
| 6,173,318 | * 1/2001 | Jackson et al. ..................... 709/219 |
| 6,182,141 | * 1/2001 | Blum et al. ......................... 709/227 |
| 6,182,144 | * 1/2001 | England ............................. 709/232 |
| 6,219,696 | * 4/2001 | Wynblatt et al. ................... 709/218 |

FOREIGN PATENT DOCUMENTS

2307625 * 5/1997 (GB) .

* cited by examiner

Primary Examiner—Kenneth R. Coulter
(74) Attorney, Agent, or Firm—Woodbridge & Associates, P.C.; Richard C. Woodbridge

(57) ABSTRACT

An optimized wireless communication system includes an enhanced communications transport protocol to reduce the overhead required by the system and intelligent protocol agents (IPAs) that process and optimize standard applications before passing them on to the transport protocol.

6 Claims, 2 Drawing Sheets

OPTIMIZED WIRELESS COMMUNICATION SYSTEM

CROSS-REFERENCE TO RELATED APPLICATIONS

This application claims the priority of U.S. Provisional Patent Application Ser. No. 60/087,723 filed on Jun. 2, 1998 entitled "OPTIMIZED WIRELESS ACCESS TO TCP/IP NETWORK USING PROXY SERVERS AND INTELLIGENT PROTOCOL AGENTS", the entire contents and substance of which are hereby incorporated by reference.

BACKGROUND OF THE INVENTION

1. Field of the Invention

Generally described, the invention comprises a wireless communication system with an optimized transport protocol.

2. Description of Related Art

The demand for wireless wide area networks has increased dramatically. Unfortunately, the wireless environment remains hostile for TCP/IP-based ("Transmission Control Protocol/Internet Protocol") communications. One problem is that TCP/IP protocol is laden with overhead and is not reliable under adverse wireless coverage conditions. TCP was designed as a protocol to be used on wired networks between devices that are always connected on a network. It is considered "chatty" in that it uses many data packets to carry essential information. Another problem is that most of the TCP/IP based applications are designed for high-speed connections and as a result end up sending too much data. In other words, conventional wired TCP/IP applications are designed for high-speed networks where system overhead is not an issue. In wireless applications, however, these problems result in poor data throughput, high communications costs, unreliable connections and reduced device battery life.

A typical prior art internet TCP/IP model is illustrated in FIG. 1. In the standard prior art TCP/IP model of FIG. 1, IP-based applications use the Winsock (Windows Sockets) API to communicate via TCP/IP over the Internet, Intranets or corporate LANs.

TCP expects both ends of the communications link (Mobile and Server) to remain connected to the network during the entire exchange. It is, therefore, not well suited for mobile applications where there might be, for example, a blackout. Despite this fact, many in the computer industry still believe that TCP/IP is the best choice for all network communications simply because it is widely used for other Internet, Intranet or LAN computer networks.

In a compromise arrangement, some providers have replaced TCP with User Datagram Protocol (UDP), which is a somewhat friendlier form of TCP. Unlike TCP, UDP is connectionless and unacknowledged during operation. In addition, it does not send a handshake and is truly "send and pray" in that UDP neither acknowledges message receipt nor requests re-transmission of lost packets. When TCP is compared to UDP, we note that TCP requires a minimum of three overhead packets simply to set up the call (open socket) while UDP requires none. Accordingly, TCP sends one acknowledgement for every two packets depending on the window size while UDP sends none. In practice, it has been observed that for every packet sent over CDPD ("Cellular Digital Packet Data") one acknowledgment is sent. This is because TCP's acknowledgment timer expires before the window size is reached on slower, wireless networks, even on CDPD, which is a relatively fast network. For high-speed, low latency networks, the window size is usually reached first. For lower speed, relatively high latency networks, the acknowledgment timer expires first, hence, one acknowledgment per packet.

In addition, TCP requires three or more overhead packets to close the socket (disconnect) while UDP requires none. UDP, by itself, is also a non-reliable protocol, which offsets the advantages of its low overhead. In conclusion, neither TCP nor UDP are well suited for networks that operate with limited bandwidth or over communication links that may be disrupted due to noise coverage problems or system noise.

One alternative to using TCP or UDP is to design a network protocol which allows very little overhead to be used in a connectionless manner and still provide feedback to the application to inform it of packet delivery or non-delivery. Ericsson's Mobitex® network and Motorola's DataTAC® network are examples of such networks. They have proprietary protocols which are designed to facilitate optimal use of wireless resources. Such networks are probably more common today than networks which are IP-based. The biggest disadvantage of such networks, however, is that standard TCP or UDP applications cannot be used on them because they are not IP-based. The prior art literature does include descriptions with efforts to improve or optimize wireless communications. See, for example, U.S. Pat. No. 5,673,322 which describes an interface between a protected computer or computer network and the World Wide Web (www), using both wireless and wire line connections. The interface comprises a split proxy system that encapsulates TCP/IP transmissions into a script transmission, which is not subject to problems in high latency systems, thereby greatly improving www access, via a wireless modem or other low-bandwidth communication network.

Other U.S. patent disclosures of possible, but less, relevance include: U.S. Pat. Nos. 5,742,668; 5,742,905; and, 5,327,486.

It was in the context of the foregoing environment that the present invention arose.

SUMMARY OF THE INVENTION

Briefly described, the invention comprises a communication system including a mobile part and a server part which includes an optimized communications layer to replace the standard TCP/IP protocol while retaining full compatibility with standard IP applications. The optimized system employs proxy server technology, the same technology used to implement firewalls, in order to improve the efficacy of IP-based applications when running over wireless or other mobile networks. With proxy server technology, the application continues to use the Winsock API to send and receive messages. However, all messages now pass through the proxy server located on both the mobile and server sides of the mobile network. The proxy servers replace the TCP/IP protocol with a highly optimized communications layer, which retains full compatibility with the pre-existing IP applications.

By inserting a proxy server, optimizations are introduced at both the transport layer and application layer. At the transport layer, the number of packets sent and received is reduced dramatically just by replacing TCP/IP with the optimized wireless transport protocol described herein, thereby saving airtime charges, extending device battery life, reducing network congestion and improving overall communication performance. The optimized protocol is also able to adapt automatically to fluctuating coverage conditions and is, therefore, much more reliable than TCP/IP when running over mobile networks.

In order to optimize the application layer, messages can be routed to an "Intelligent Protocol Agent" (IPA) for additional processing and optimization before passing them on to the transport protocol. The system according to the preferred embodiment includes an IPA for File Transfer Protocol (FTP). Other IPAs can be developed using the model described herein. Following are several applications of IPAs:

1. Optimizing higher layer IP protocols such as HTTP (Hypertext Transfer Protocol —used in browsers), FTP (used in file transfers), or POP3 (Post Office Protocol, Version 3), SMTP (Simple Mail Transfer Protocol) and IMAP4 (Internet Message Access Protocol, Version 4) (used for Internet e-mail).

2. Optimizing other TCP or UDP applications that use their own internal protocols, such as those written by corporate developers or other third parties.

3. Introducing additional efficiencies such as message filtering, caching, spoofing, batching, message queuing, least cost routing, and others.

The IPAs complement the optimizations provided by the system. IPAs optimize the way the application behaves, whereas the transport protocol reduces the overhead required to have a reliable, robust communication over any wireless network.

The foregoing may be further understood by reference to the following drawings.

DETAILED DESCRIPTION OF THE INVENTION

During the course of this description like numbers will be used to identify like elements according to the different figures that illustrate the invention.

Figure 1:
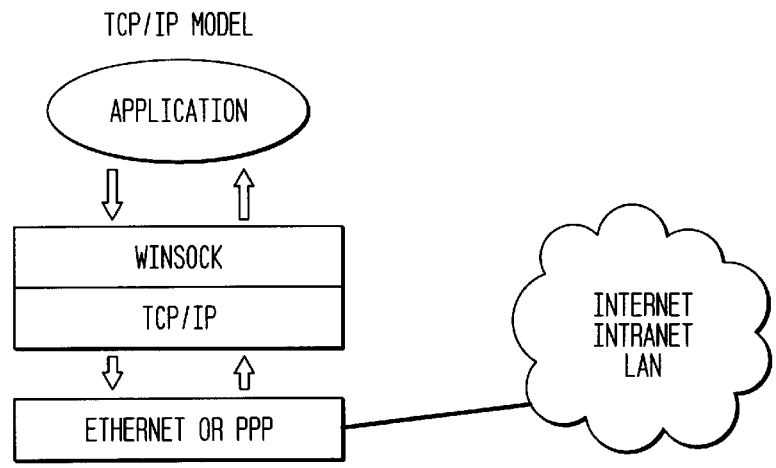
FIG. 1 illustrates a conventional prior art communication system employing standard TCP/IP protocol to interface a conventional application with a local area network (LAN), an Intranet, or the Internet.
Figure 2:
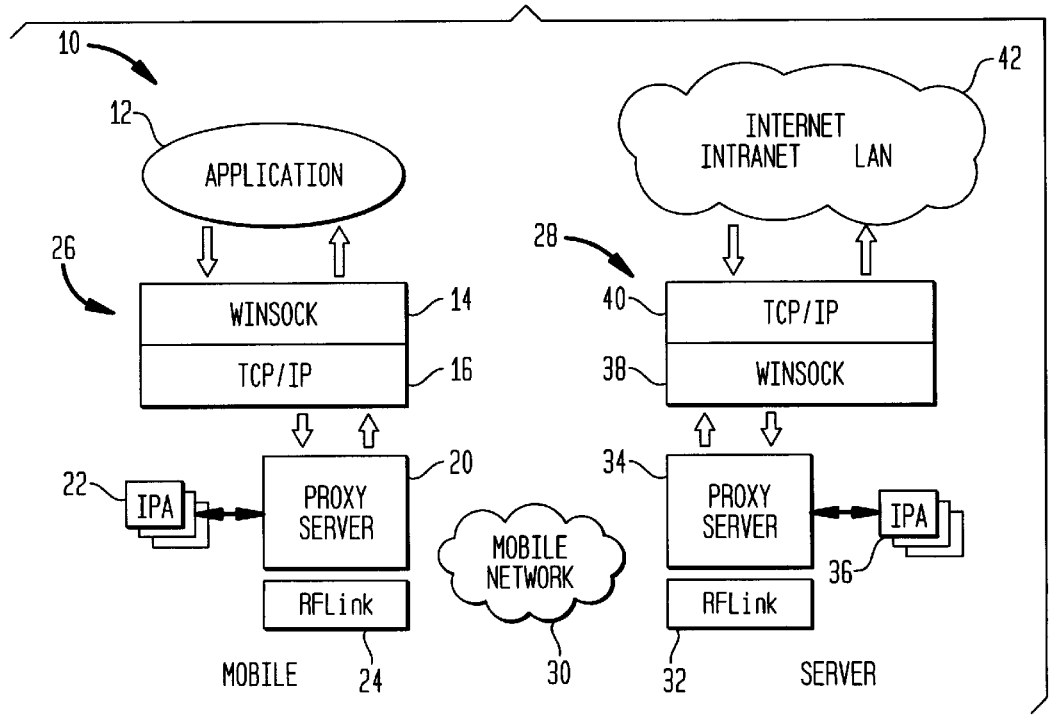
FIG. 2 illustrates the optimized wireless communication system according to the preferred embodiment of the invention including a server and at least one mobile unit.

The preferred embodiment of the invention 10 is illustrated in detail in FIG. 2. The mobile side 26 includes a standard application program 12 that provides data to, and accepts data from, a standard Winsock 14 which, in turn, interfaces with the standard TCP/IP protocol 16. The TCP/IP protocol, in turn, interfaces with proxy server 20 which sends and receives data from IPA 22. Data is forwarded, or received from, the RFlink™ protocol 24 and transmitted over a conventional wireless mobile network 30 to the RFlink™ 32 on the server side 28 of the invention. RFlink™ is a trademark of Nettech Systems, Inc. Data from the server RFlink™ 32 interfaces with proxy server 34 which, in turn, sends and receives data from IPA 36. Data is also sent and received to server Winsock 38 and is transmitted via TCP/IP protocol 40 to a local area network (LAN) or an Intranet or the Internet 42.

Figure 3:
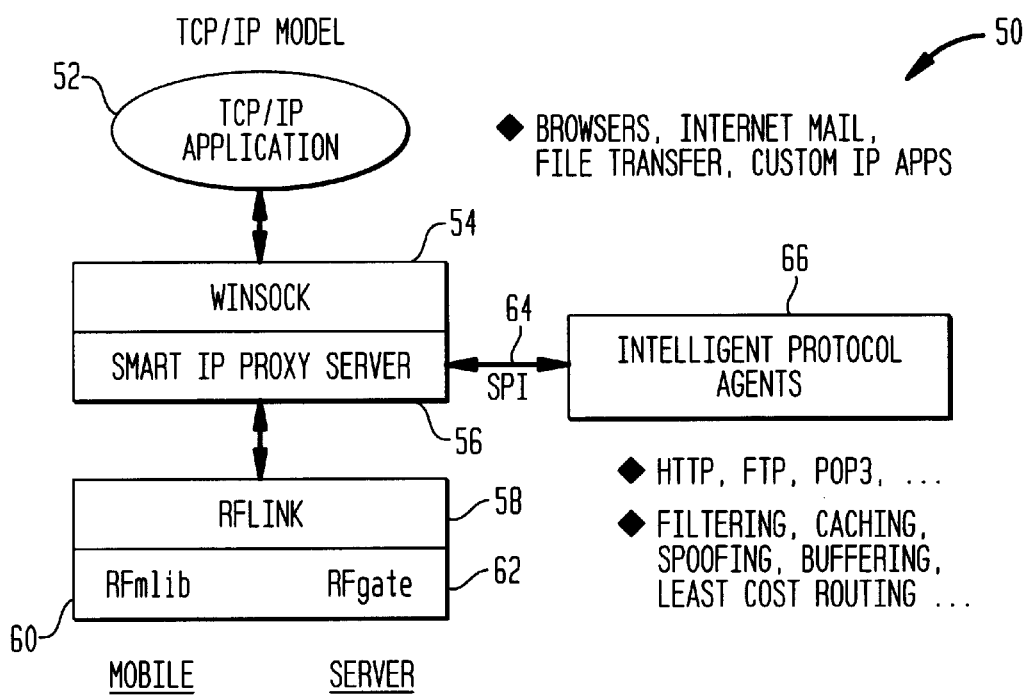
FIG. 3 illustrates the proxy server structure according to the preferred embodiment of the invention.

Details of the proxy server 50 are illustrated further in FIG. 3. TCP/IP applications 52 accept and transmit data to Winsock 54 and are transmitted through proxy server 56 to RFlink™ 58. A service provider interface (SPI) 64 transmits data to and from the Intelligent Protocol Agents (IPAs) 66. Data from proxy server 56 is also sent to and received from RFlink™ 58 which, in turn, sends and receives information via mobile RFMlib™ 60 or server RFgate™ 62.

By inserting proxy servers 20 on the mobile side 26 and proxy server 34 on the server side 28, optimizations are introduced at both the transport and application layer. At the application layer, application-specific intelligent protocol agents (IPAs) are employed to further improve application performance without changing the application itself. At the transport layer, the number of packets sent and received is dramatically reduced simply by replacing TCP/IP with an optimized wireless transport protocol known as RFlink™. RFlink™ is an example of one known transport mechanism and protocol that can be optimized according to the present invention. Other transports exist that could be optimized too. RFlink™ automatically adapts to fluctuating coverage conditions and is, therefore, considerably more reliable than TCP/IP when running over networks that provide for mobile connectivity. RFlink™ also supports compression which further reduces the amount of data that needs to be sent and further reduces costs and improves throughput. RFlink™ is a commercially available software package that can be obtained from Nettech Systems, Inc., 600 Alexander Road, Princeton, N.J. 08540. The resulting savings substantially reduce airtime charges, extends battery life, reduces network congestion and provides an overall improvement in the communications performance.

Figure 4:
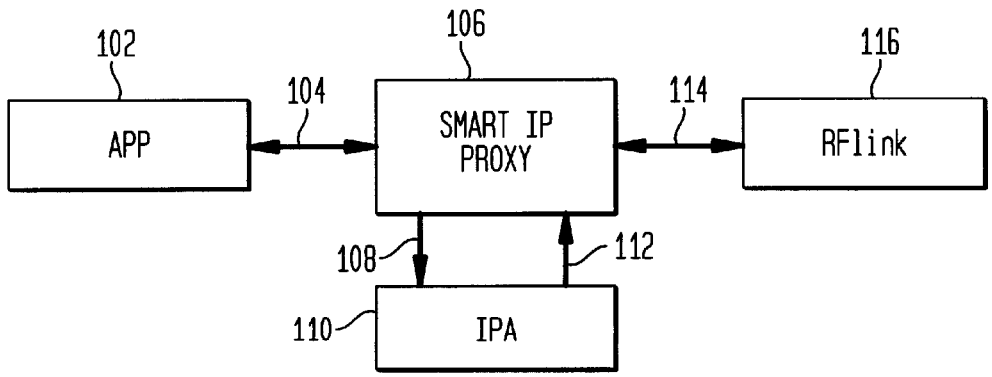
FIG. 4 isolates the functions of the Intelligent Protocol Agent (IPA) in the context of a mobile device embodiment.

A detailed understanding of the IPA, such as shown in FIG. 3 is useful for a better understanding of the invention 10 as a whole. An IPA is a module which is loaded and invoked by a Smart IP Proxy at run time for a particular TCP or UDP protocol, as defined in the Smart IP configuration. For example, an IPA might be defined for the FTP, HTTP, or Telnet protocols. The protocol is recognized by the port number defined in the configuration. All data which flows over a socket for such a protocol is then filtered through the IPA. The Smart IP Proxy invokes the IPA through a Service Provider Interface (SPI). FIG. 4 isolates the functions of the IPA so it might be better understood in the context of a mobile device.

In FIG. 4, the Application 102 creates a socket 104 with the Smart IP Proxy 106 at whatever port is designated in the Smart IP configuration for the application protocol. Upon recognizing the new socket, the Smart IP Proxy 106 determines that the protocol uses an IPA 110 and loads the IPA 110, which is in the form of a Dynamic Load Library (DLL). It then calls the IPA 110 through the Service Provider Interface 108 to initialize the IPA 110. When the application 102 sends data over the socket to the Smart IP Proxy 106, Smart IP Proxy 106 passes this data to the IPA 110 through the SPI 108. The IPA 102 may do whatever it wants with the data, such as buffer the data waiting for more data from the application 102, cache the data for subsequent retrieval, spoof a response from the application server, modify the data, or simply send the data on unchanged. At some point, the IPA 110 will need to send data on to the server or back to the application 102. In both cases, it does so by making a call to through the SPI Callback mechanism 112, instructing the Smart IP Proxy how to deal with the data. This may be an indication to send the data on to the application via RFlink 116 or back to the application 102. If the data is to be sent via RFlink 116, the Smart IP Proxy establishes a transmission 114 with RFlink 116 and sends the data. If the data is to be sent to the application 110, the Smart IP Proxy merely sends the data back over the socket to the application 110.

Likewise, when data is received from RFlink 116, a transmission entity 114 is created and the data is received by the Smart IP Proxy 106. Smart IP Proxy 106 passes the data to the IPA 110 via the SPI 108. Again, the IPA 110 must decide when and what to do with the data. At some point, it will want to send some response back to the application 102. It does so by using the SPI Callback 112, and instructing Smart IP Proxy 106 to send the data over the socket 104 to the application 102.

What has just been discussed is from the client (mobile device) point of view. In fact, however, the same flow occurs in the Smart IP Server version of the Proxy, except that data usually starts out being received via RFlink 116 and sent on to the real Application Server over a socket.

The Smart IP SPI is organized into two sets of functions: (1) Functions in the IPA 110 which are called from Smart IP 106, and, (2) Callback functions in Smart IP 106 which are called from the IPA 110.

Function Set No. 1

IPA SPI Functions

The following functions are defined in the current implementation:

a. IpaInit

---

Prototype:
BOOL IPA_ENTRY IpaInit(  BOOL IsInternet,
                          LP_IPA_CALLBACK lpCallBack);

---

Description: This function in the IPA is called when the IPA is first loaded. It indicates via the IsInternet parameter whether this is the Smart IP Server (TRUE) or the Smart IP Client (FALSE). The lpCallBack parameter supplies the address of the Smart IP SPI callback function.

b. IpaClose

---

Prototype:
BOOL IPA_ENTRY IpaClose(void);

---

Description: This function is called when the system is shutting down and the IPA is no longer needed. It allows the IPA to perform any cleanup that it requires.

c. IpaNewAppCon

---

Prototype:
BOOL IPA_ENTRY IpaNewAppConn(  DWORD ConnId,
                                TLPPROXYDATA pData);

---

Description: This function is called when a new socket connection is detected from an application and the application connection is defined with an option to create a connection as soon as possible, before any data is sent. This is because some application protocols arrange that the server send data to the client as soon as the connection is made. The call passes an identifier or handle for the connection in the ConnId parameter. Further information regarding the connection is passed via a structure which is pointed to by the pData parameter.

d. IpaNewAppData

---

Prototype:
BOOL IPA_ENTRY IpNewAppData(  DWORD ConnId,
                               TLPPROXYDATA pData);

---

Description: This function is called whenever new data is received from the application over an existing or a new socket connection. The connection identifier is passed via the ConnId parameter, and information about the data is described in a structure which is pointed to by the pData function.

e. IpaNewRFData

---

Prototype:
BOOL IPA_ENTRY IpaNewRdData(  DWORD RFHdl,
                               TLPPROXYDATA pData);

---

Description: This function is called whenever new data is received from RFlink. The first parameter is a handle for the RFlink connection and the data is described in the structure pointed to by the pData parameter.

f. IpaClosingDataConn

---

Prototype:
BOOL IPA_ENTRY IpaClosingDataConn(  DWORD ConnId,
                                     TLPPROXYDATA pData);

---

Description: This function is called when a "slave" socket connection is being closed. The first parameter supplies the connection identifier of the master connection and the second is a pointer to a structure which provides additional information about the master connection. A "slave" connection is one that was opened via the IpaOpenDataConn callback function.

g. IpaRfError

---

Prototype:
BOOL IPA_ENTRY IpaRfError(  DWORD ConnId,
                             TLPRFDATA pRFdata);

---

Description: This function is called when an error occurs on an outbound RFlink transmission previously initiated by the IPA. The IPA can decide to retry the transmission or to abandon the transmission by making the appropriate callbacks (IapaResendRFData or IpaSkipRFData). The IPA may also decide that the socket should be closed after some number of retry attempts or it may generate some kind of error indication to the application.

h. IpaSocketError

---

Prototype:
BOOL IPA_ENTRY IpaSocketError(  DWORD ConnId,
                                 WORD SockOpId,
                                 WORD ErrCode);

---

Description: This function is called to indicate that a socket error occurred. The SockOpId parameter indicates what type of operation was being attempted when the error occurred, e.g. read or write. The ErrCode parameter indicates the error code received.

Function Set No. 2
IPA SPI Callback Functions

The following are the callback functions which an IPA may make to Smart IP. There is actually only one function address which is called, and the desired action is indicated via the first parameter to the callback.

The prototype for the callback is:

```
BOOL IPA_CALLBACK IpaHandleAction(
                WORD       wAction,
                LPDWORD    lpConnId,
                LPVOID     lpParam1,
                LPVOID     lpParam2);
```

Where:
wAction specifies the action that the IPA requests from the Smart IP Proxy
lpConnId specifies a pointer to the connection identifier to which the action applies
lpParam1 is a pointer to some data required by the action
lpParam2 is another pointer to some data required by the action The actual meaning of the data pointed to by the last two parameters depends on the action being requested.

The possible actions are indicated by the following constant definitions:

```
#define IpaActSendAppData       0
#define IpaActSendRFData        1
#define IpaActCloseConn         2
#define IpaActSetRFParams       3
#define IpaActSetIPParams       4
#define IpaActWriteToLogFile    5
#define IpaActOpenDataConn      6
#define IpaActCloseDataConn     7
#define IpaActResendRFData      8
#define IpaActSkipRFData        9
``` a. IpaActSendAppData
This callback function requests Smart IP to send data to the application over the indicated socket.

b. IpaActSendRFData
This callback function requests Smart IP to send data via RFlink.

c. IpaActCloseConn
This callback function requests Smart IP to close the indicated connection, including any open sockets or RFlink transmissions.

d. IpaActSetRFParams
This callback function allows the IPA to specify RFlink options for any transmissions used by this connection, such as whether compression will be used. This function was defined in the initial specification but was not implemented in the initial embodiment. It is reserved for future implementation.

e. IpaActSetIPParams
This callback function allows the IPA to define any socket options required for this connection. This function was defined in the initial specification but was not implemented in the initial embodiment. It is reserved for future implementation.

f. IpaActWriteToLogFile
This callback function allows the IPA to log data to a log file.

g. IpaOpenDataConn
This callback function allows the IPA to open a new socket connection, or so-called "slave" connection, that is required by the application. This is required for some application protocols which open multiple connections for the same application, for example a control and a data connection.

h. IpaCloseDataConn
This callback function requests that an associated "slave" connection for the specified master socket connection be closed.

i. IpaResendRFData
This callback function requests Smart IP to resend data via RFlink that failed on a previous attempt.

j. IpaSkipRFData
This callback function instructs Smart IP to discontinue retrying a failed RFlink transmission.

Tests run have shown that for simple FTP communications, the present invention substantially outperforms TCP/IP by a significant percentage. See the table below:

| Command | Smart IP Packet Count | Native FTP |
|---|---|---|
| Get 123 bytes | 6 packets | 17 packets |
| Get 679 bytes | 6 packets | 19 packets |
| Get 33,176 bytes | 17 packets | 145 packets |

The differences can also been seen in the number of packets used by RFlink™ versus TCP or UDP as set forth in the table below:

| | |
|---|---|
| Call Set-UP | |
| RFlink | 0 packets |
| TCP | 3 packets |
| UDP | 0 packets |
| Acknowledgments | |
| RFlink | 1 per message |
| TCP | 1 every 1–2 packets |
| UDP | Unreliable |
| Retries, Resends | |
| RFlink | Missing packet |
| TCP | Missing packet + every subsequent packet |
| UDP | None |
| Call Take-Down | |
| RFlink | 0 packets |
| TCP | 3 packets |
| UDP | 0 packets |

The foregoing demonstrates the advantage of the present invention when using native FTP versus the present system with FTP employing an Intelligent Protocol Agent (IPA) over an IP (CDPD) network.

The invention also substantially reduces the overhead in HTTP systems. A web page with simple text in eight images was transmitted with the following results:

| Images Enabled | |
|---|---|
| Native HTTP: | 314 packets, 62,688 bytes |
| Smart IP: | 80 packets, 47,421 bytes |
| Without Images | |
| Native HTTP: | 39 packets, 9,634 bytes |
| Smart IP: | 6 packets, 2,947 bytes |

As can be seen from the foregoing, the larger the message the greater the savings in overhead. This is true not only for wireless networks but also for any network. The present invention makes non-IP-based networks appear to be IP-based. It also improves performance for CDPD, which is already an IP-based network, and it can dramatically improve performance on dial-up or session-based wireless communications.

The system described requires the following support:

Client: Windows 3.1, Windows 95, WindowsNT, Windows CE

Server: WindowsNT

System requirements:

1. Mobile Operating Systems: Windows 3.1, Windows 95, Windows NT 3.5 or later, Windows CE Server: WindowsNT Server or Workstation (v3.5 or later)

2. Development Tools (for developing an IPA):

Microsoft C/C++7.0 or Borland C++4.52 or later

3. Hardware Requirements a. Mobile—386 processor or later b. Server—the minimum processor and memory requirements for the underlying operating system are sufficient to run the present invention. A Pentium 90 MHz or higher with 32 MB RAM and 1 GB hard drive are recommended.

The present invention currently supports the following networks:

Public Mobile Data Networks: ARDIS, CDPD, Data TAC 5000/6000, Mobitex (RAM)

Circuit Switched Networks: Cellular (AMPS/CDMA/GSM), Wireline

LANS: Local Area Networks, Wireless Local Area Networks

Packet Satellite: Norcom Networks

Private Packet Radio Networks: Ericsson EDACS*, Motorola RNC 3000/6000

*Requires Ericsson NDIS driver; available only from Ericsson

The present invention has two important characteristics that distinguish it from other wireless networks.

A first major characteristic is that the invention provides a method of substituting the traditional TCP/IP transport protocol with any transport technology (for example, custom, proprietary or widely used) for the purposes of a) optimization; b) support of nonstandard devices or protocols; or c) almost anything else. The disclosure describes the use of the well known RFlink™ technology, but other transports could have been used as well. For example, one could use the teachings of the present invention to deploy internet over IBM's SNA (Systems Network Architecture). Alternatively, the client side could be a completely custom device with no TCP/IP available and this invention would enable such a device to communicate with almost any known internet system throughout the world.

A second major unique characteristic is the use of IPA's. Broadly speaking, using IPA's in conjunction with proxies enables content manipulation for any purpose transparently, generically, and invisible to the application. Therefore, while the present IPAs are being used to optimize the system, they could just as well have been used to filter out unwanted material from the internet user (for example, young children) or to translate all documents into Latin before delivering them to an Internet Service Provider (ISP) or to enforce Y2K compliance in custom MIS applications.

In summary, the present invention has the following advantages over the prior art. First, it provides for reliable transmission of messages of any size. Second, it minimizes packet overhead and the number of acknowledgments required. Third, the battery life of the modem is increased because fewer transmissions are required. Fourth, it adapts automatically to fluctuating wireless conditions. Fifth, it resends only missing packages. Sixth, it runs practically any TCP/UDP application. Seventh, it allows optimization of a TCP or UDP application without modifying the application. Eighth, the IPAs can perform or facilitate other functions.

While the invention has been described with reference to the preferred embodiment thereof, it will be appreciated by those of ordinary skill in the art that modifications can be made to the structure of the invention without departing from the spirit and scope thereof.

We claim:

1. A wireless communications system for communicating over a wireless network including a server and at least one mobile unit, said system comprising:

a mobile side unit comprising an application, a Winsock for communicating with said application, a TCP/IP interface for communicating with said Winsock, a mobile side proxy server, and a mobile communications link protocol for communicating with said mobile wireless network; and, Intelligent Protocol Agent (IPA) means for communicating data to and from said mobile side proxy server and for streamline communications between said mobile side application and said mobile communications link protocol, said IPA means including means for calling call back functions from a proxy server and means for providing functions when said IPA means receives a call from a proxy server.

2. A wireless communication system for communicating with a mobile wireless network including a server and at least one mobile unit, said system comprising:

a mobile side unit comprising an application, a Winsock for communicating with said application, a TCP/IP interface for communicating with said Winsock, a mobile side proxy server, and a mobile communications link protocol for communicating with said mobile wireless network;

a server side unit comprising a mobile communications link for sending and receiving data through said mobile wireless network from said mobile side unit, a server side proxy server for communicating data to and from said mobile communications link protocol, a Winsock for receiving and communicating data from said server side proxy server, and a TCP/IP interface for communicating data with said server side Winsock and for communicating with a non-wireless network; and, mobile side Intelligent Protocol Agent (IPA) means for communicating data to and from said mobile side proxy server and for streamline communication between said mobile side application and said mobile communications link protocol, said IPA means including means for calling call back functions from a proxy server and means for providing functions when said IPA receives a call from a proxy server.

3. A wireless communications system for communicating over a mobile wireless network including a server and at least one mobile unit, said system comprising:
- a mobile side unit comprising an application, a Winsock for communicating with said application, a TCP/IP interface for communicating with said Winsock, a mobile side proxy server, and a mobile communications link protocol for communicating with said mobile wireless network;
- a server side unit comprising a mobile communications link for sending and receiving data through said mobile wireless network from said mobile side unit, a server side proxy server for communicating data to and from said mobile communications link protocol, a Winsock for receiving and communicating data from said server side proxy server, and a TCP/IP interface for communicating data with said server side Winsock and for communicating with a non-wireless network; and,
- server side Intelligent Protocol Agent (IPA) means for communicating data to and from said server side proxy server and for streamlining communications between said server side communications link protocol and said server side non-wireless network, said IPA means including means for calling call back functions from a proxy server and means for providing functions when said IPA means receives a call from a proxy server.

4. A wireless communication system for communicating over a mobile wireless network including a server and at least one mobile unit, said system comprising:
- a server side unit comprising a mobile communications link for sending and receiving data through said mobile wireless network from a mobile side unit, a server side proxy server for communicating data to and from a mobile communications link protocol, a Winsock for receiving and communicating data from said server side proxy server, and a TCP/IP interface for communicating data with said server side Winsock and for communicating with a non-wireless network; and,
- server side Intelligent Protocol Agent (IPA) means for communicating data to and from said server side proxy server and for streamline communication between said server side communications link protocol and said server side non-wireless network, wherein said IPA means includes means for calling call back functions from a proxy server and means for providing functions when said IPA means receives a call from a proxy server.

5. A wireless communication system for communicating over a mobile wireless network including a server and at least one mobile unit, said system comprising:
- a mobile side unit comprising an application, a Winsock for communicating with said application, a TCP/IP interface for communicating with said Winsock, and a mobile communications link protocol for communicating with said mobile wireless network;
- a server side unit comprising a mobile communications link for sending and receiving data through said mobile wireless network from said mobile side unit, a Winsock for receiving and communicating data from a proxy server, and a TCP/IP interface for communicating data with said server side Winsock and for communicating with a non-wireless network;
- proxy server means for communicating data to and from communications link protocols; and,
- Intelligent Protocol Agent (IPA) means for communicating data to and from said proxy server means and streamlining communications with said communications link protocols, said IPA means including means for calling call back functions from a proxy server and means for providing functions when said IPA means receives a call from a proxy server.

6. A wireless communication system for communicating with a mobile wireless network including a server and at least one mobile unit, said system comprising:
- a mobile side unit comprising an application, a Winsock for communicating with said application, a TCP/IP interface for communicating with said Winsock, a mobile side proxy server, and a mobile communications link protocol for communicating with said mobile wireless network;
- a server side unit comprising a mobile communications link for sending and receiving data through said mobile wireless network from said mobile side unit, a server side proxy server for communicating data to and from said mobile communications link protocol, a Winsock for receiving and communicating data from said server side proxy server, and a TCP/IP interface for communicating data with said server side Winsock and for communicating with a non-wireless network;
- mobile side Intelligent Protocol Agent (IPA) means for communicating data to and from said mobile side proxy server and for streamline communication between said mobile side application and said mobile communications link protocol, said IPA means including means for calling call back functions from a proxy server and means for providing functions when said IPA receives a call from a proxy server; and,
- server side Intelligent Protocol Agent (IPA) means for communicating data to and from said server side proxy server and for streamlining communications between said server side communications link protocol and said server side non-wireless network, said IPA means including means for calling call back functions from a proxy server and means for providing functions when said IPA means receives a call from a proxy server.

* * * * *